Oct. 14, 1930.     K. BAUMANN     1,778,014
LABYRINTH GLAND PACKING
Original Filed Sept. 8, 1924
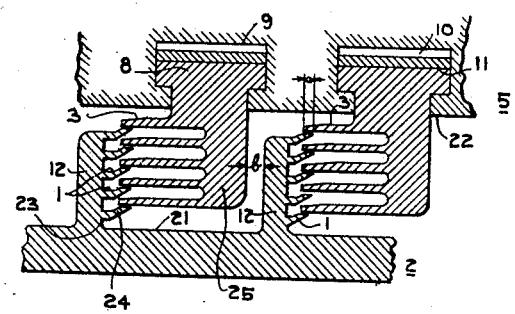
WITNESS
E. Lutz.
INVENTOR
Karl Baumann
BY
A. B. Reavis
ATTORNEY Patented Oct. 14, 1930

1,778,014

UNITED STATES PATENT OFFICE

KARL BAUMANN, OF URMSTON, ENGLAND, ASSIGNOR TO WESTINGHOUSE ELECTRIC AND MANUFACTURING COMPANY, A CORPORATION OF PENNSYLVANIA

LABYRINTH GLAND PACKING

Original application filed September 8, 1924, Serial No. 736,638, and in Great Britain September 12, 1923. Divided and this application filed September 12, 1928. Serial No. 305,552.

This application is a division of application, Serial No. 736,638, filed September 8, 1924 and assigned to the Westinghouse Electric and Manufacturing Company.

This invention relates to a labyrinth gland packing between a moving part and a fixed part of a machine, such as for instance between a turbine shaft and the part of the casing through which it passes.

An efficient labyrinth gland between fixed and moving parts should satisfy the following conditions:—

1. The mass near the point of contact between the parts should be small, so that in case of rubbing taking place, only local heating will occur.

2. The effect of deflection or distortion or expansion of the parts should be to increase the clearance so that heavy rubbing cannot occur.

3. The paths for the flow of fluid through the packing should be as tortuous as possible.

4. The clearance in the packing should decrease with an increase of pressure of the fluid the escape of which through the packing is to be prevented.

5. The axial length of the packing should be as small as possible.

In accordance with the invention, a labyrinth packing gland comprises a strip secured to one of a pair of relatively movable bodies and including a part which is free to expand and contract under temperature variations, this part being so arranged that any expansion thereof increases the clearance between the same and a cooperating part of the other relatively movable body. Preferably the improved packing comprises a plurality of relatively thin and flexible cylindrical or annular or slightly conical strips secured to one of the relatively movable parts, with the cylindrical surface of which strips the edges of projecting fins or packing elements attached to the other relatively moving part are adapted to cooperate. The relative location of the cylindrical, annular or slightly conical strips and the projecting fins or packing elements is such that, irrespective of which of these two parts is rotating, the projecting fins are internal, i. e. nearer to the center of the shaft than the cylindrical annular or slightly conical strips with which they cooperate. Consequently, if rubbing takes place between the parts the cylindrical strips will, as the result of heating taking place, expand and move in a direction away from the cooperating fins. thereby automatically increasing the clearance between them and preventing hard rubbing and consequent wear.

The aforementioned fins are preferably somewhat short and stiff and are thinned at the edges which are opposite to the flexible cylindrical parts. Consequently, if heating occurs at the edges the heat will be comparatively rapidly conducted away by the thicker portions to the part on which the fins are mounted and in any case the relatively colder parts of the fins will prevent the hotter parts from expanding in a radial direction and thus from following up the expansion of the cooperating external cylindrical portions of the packing.

In order to provide as tortuous as possible a path for the fluid leaking thru the packing in the minimum axial length of the packing, the cylindrical strips and the fins are telescopically arranged in groups, each group being carried by a radially-extending supporting part or flange. Sufficient axial clearance is provided between the supporting parts and the flanges to permit relative axial movement for assembly and disassembly.

The two parts forming the packing, namely the cylindrical portions and the fins, may be made of the same material or the cylindrical portions may be made of a material having a higher coefficient of expansion with temperature than that of the other portions. For convenience in manufacture the cylindrical and supporting parts may be arranged to be stationary and the cooperating fins and flanges are attached to the movable part of the machine, the shaft for example, but these positions may be reversed if desired.

In order that the invention may be more clearly understood and readily carried into practice, reference will now be made to the accompanying drawing, in which:

The single figure is a longitudinal section through one constructional form of the invention.

Referring now to the drawing more in detail, I show a rotatable part 2, which may be a shaft or sleeve having an outer cylindrical surface 21, and a stationary part 5, which may be a part of the casing surrounding the shaft and having an inner cylindrical surface 22. Extending radially outwardly from the shaft or sleeve 2 are a plurality of flanges 12, carrying packing elements 1 on one side thereof. The packing elements of each flange are, therefore, arranged in telescopic or axially overlapping relation.

Each packing element 1 comprises a cylindrical portion 23 extending axially from the flange 12 and a conical portion 24 extending from the cylindrical portion in a direction which is radially outwardly and axially from the flange 12. The packing elements 1 are relatively short and stiff.

Disposed opposite the side of each flange on which the packing elements 1 are disposed, is a supporting part 25 extending radially inwardly from the stationary part 5. The supporting parts are formed with root portions 8 which are circumferentially slid into undercut grooves or recesses 9 in the stationary part 5. Sufficient clearance may be left at 10 for the reception of resilient packing pieces or springs 11.

A plurality of substantially cylindrical packing strips 3, arranged in telescopic relation with the free edges substantially in a radial plane, are secured to and extend axially from the side of each supporting part 25 facing the packing elements 1. Each packing strip 3 is so disposed that the free-edge portion thereof encompasses the free edge of one of the packing elements 1, cooperating therewith to provide a close clearance for minimizing the flow of fluid through the space between the cylindrical surfaces 21 and 22. The cylindrical packing strips 3 are relatively thin and flexible and of greater axial extent than the packing elements 1.

In case of accidental rubbing and heating, the free edge portions of the packing strips 3 will be free to expand and move radially outwardly, away from the packing elements 1, due to their greater axial extent, while the packing elements 1 will not be as free to move radially outwardly due to the fact that they are shorter and to the fact that the free edge portions extend in a direction which is as much radial as axial. The axial heat generated in the packing elements 1 is conducted more rapidly to the colder and more massive flanges 12. The packing strips and elements will, therefore, tend to separate to prevent further rubbing and consequent wear or injury.

In this construction, in order to permit the assembly and disassembly of the packing, the stationary part must be capable of axial movement, relative to the rotatable part 2, a distance greater than the axial overlap of the packing strips 3 and the packing elements 1, this overlap being indicated on the drawing by the arrows $a$. Consequently an axial clearance $b$, greater than the distance $a$, must be provided between the sides of the flanges 12 and the supporting parts 25 opposite those carrying the packing strips and elements. To disassemble the packing, the stationary part is moved to the right relative to the shaft 2, and then moved radially outwardly.

From the above description, it will be noted that I have provided a construction wherein packing members, of the type providing increased radial clearance in case of rubbing, are arranged in telescopic relation in a number of groups which may be disposed in an axial row. I have, therefore, greatly increased the number of packing members which may be provided in a given space, and as the space in a machine, such as a steam turbine, available for packing is limited, it will be apparent that I have greatly increased the effectiveness thereof.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a labyrinth gland packing for a pair of relatively rotatable bodies, the combination of a plurality of relatively thin, flexible substantially cylindrical packing strips extending axially in telescopic relation from one of said bodies and having free edges disposed substantially in a radial plane, and a plurality of packing elements carried by the other body and having conical free edge portions, said portions extending in a direction radially outwardly and axially from said last-mentioned body toward said packing strips and having the free edges thereof cooperating with the inner cylindrical surfaces of said packing strips adjacent the free edges of the latter.

2. In a labyrinth gland packing for a rotatable body and a stationary body surrounding the rotatable body, the combination of supporting parts extending radially inwardly from the stationary body, a plurality of thin, flexible, substantially cylindrical packing strips extending axially from one side of each of said parts in telescopic relation and having free edges substantially in a radial plane, said rotatable body having radially-extending flanges opposing the supporting parts on the side having the packing strips, and a plurality of packing elements carried by said flanges and having conical free edge portions extending therefrom in a direction radially outwardly and axially from said last-mentioned flanges toward the inner cylindrical surfaces of said strips adjacent the free edges thereof and cooperating therewith to form a seal.

3. In a labyrinth gland packing for a rotatable body and a stationary body surrounding the rotatable body, the combination of supporting parts extending radially inwardly from the stationary body, a plurality of thin, flexible, substantially cylindrical packing strips extending axially from one side of each of said parts in telescopic relation and having free edges substantially in a radial plane, said rotatable body having radially-extending flanges opposing the supporting parts on the side having the packing strips, and a plurality of packing elements carried by said flanges and having free edge portions extending therefrom radially outwardly and axially toward the inner cylindrical surfaces of said strips adjacent the free edges thereof and cooperating therewith to form a seal, said supporting parts and said flanges being spaced on the sides opposite the sides carrying the packing strips and packing elements a distance greater than the axial overlap of the packing strips and packing elements.

4. In a labyrinth gland packing for a rotatable body and a stationary body surrounding the rotatable body, the combination of a plurality of supporting parts extending radially inwardly from the stationary body, a plurality of substantially cylindrical packing strips extending axially from one side of each of said parts in telescopic relation, said rotatable body having a plurality of radially-extending flanges opposing the supporting parts on the side having the packing strips, and a plurality of packing elements carried by each of said flanges and having free edge portions interleaving with said packing strips and cooperating therewith to form a seal, said supporting parts and said flanges being spaced on the sides opposite the sides carrying the packing strips and packing elements a distance greater than the axial overlap of the packing strips and packing elements, whereby said packing may be assembled by first moving said bodies radially toward each other and then moving said bodies axially relative to each other to interleave the packing strips and packing elements.

In testimony whereof, I have hereunto subscribed my name this ninth day of August, 1928.

KARL BAUMANN.